June 16, 1953     G. S. BUTLER     2,642,305
GARDEN WEEDER
Filed May 1, 1946
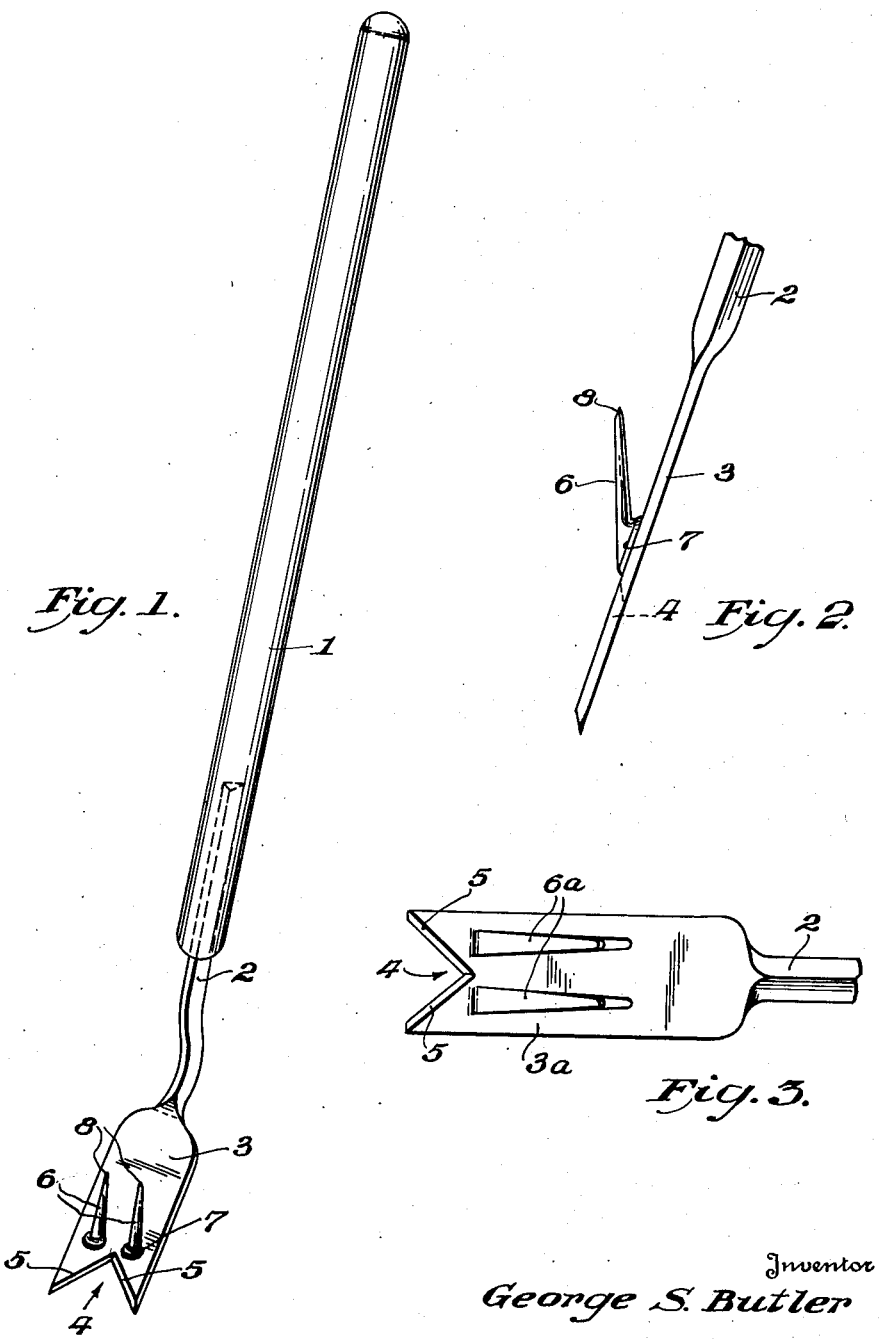
Inventor
George S. Butler
By W. J. McDowell
Attorney Patented June 16, 1953

2,642,305

UNITED STATES PATENT OFFICE 2,642,305

GARDEN WEEDER

George S. Butler, Sunbury, Ohio

Application May 1, 1946, Serial No. 666,347

2 Claims. (Cl. 294—50.6)

This invention relates to garden tools. More particularly, it is concerned with a manually operated weed cutting and digging tool.

The usual garden or lawn weeder comprises a handle-carried cutting blade having its outer end notched to produce substantially V-shaped cutting edges. Such a tool cuts very efficiently, and in an easily executed manner, the stems or roots of various lawn weeds, but in their use considerable laborious hand work is required in removing the plants and their ground roots in effecting their complete eradication from a lawn.

It is, therefore, an object of the invention to provide a lawn weeder of the type set forth in which the cutting blade thereof is formed with prong means for engaging the cut weeds and, through the manipulation of the tool, effectively removing such weeds and their roots from the soil.

It is another object to produce a weeding tool wherein the blade thereof is formed with a pair of upwardly and rearwardly directed stationary prongs, which extend in angular relationship with the plane of the weeder blade, the bases of such prongs being disposed adjacent to the V-shaped cutting edge of the blade, so that they will be positioned to enter the soil with the blade and engage the stems and roots of the weeds to facilitate the complete extraction of such plant growths from the soil in which they are embedded.

For a further understanding of the invention, reference is to be had to the following description and the accompanying drawing, wherein:

Fig. 1 is a perspective view of a lawn weeder formed in accordance with the present invention;

Fig. 2 is a detail side elevational view thereof;

Fig. 3 is a detail plan view showing a different form of the cutting and weed-removing blade.

Referring more particularly to the drawings, the numeral 1 designates the handle of my improved lawn weeder. Projecting from the lower end of the handle is a metal shank 2, the major portion of the length of which is suitably retained in a socket provided in the handle. Forwardly and downwardly, the shank terminates in a widened and flattened blade 3, having its forward and lower end formed with a notch 4 which produces sharpened V-shaped cutting edges 5.

The particular feature of the present invention consists in providing such a cutting blade with one or more upwardly, outwardly and angularly extending prongs 6. In Fig. 1, these prongs are provided with widened bases 7 which are suitably fastened, as by means of welding or the use of mechanical fasteners, to the blade proper, the prongs terminating in pointed upward extremities 8. In the use of the tool, the blade is forced into the ground adjacent the root of the weed to be removed. The edges 5 cut the root or stem of the weed, causing the stem to be positioned between the spaced prongs 6. When the tool is withdrawn from the earth, the prongs grip the weed and pull it from the soil. In this operation, the user of the tool may stand in a substantially upright position, avoiding the usual bending over to manually pick up the cut weed and to loosen it from the soil.

In Fig. 3, another form of my invention is shown in which the prongs 6a are integrally formed with the blade 3a of the tool, as by means of a metal-stamping operation. I have found both forms of my invention to be effective in fulfilling the purposes for which the weeder has been designed.

I claim:

1. A weeding tool comprising an elongated handle, a metallic soil-penetrating and weed-cutting blade carried by and projecting from the lower end of said handle, said blade being notched at its lower end to produce a pair of cutting edges arranged in substantially V-shaped order, said edges forming an apex at their upper ends, and a pair of relatively equidistantly spaced prong elements stationarily mounted on the front face of said blade contiguous to the apex of said notch on opposite sides of the longitudinal center of said blade, each of said prongs extending angularly and upwardly with respect to the plane of the front surface of said blade and in parallel order throughout their length, whereby to engage plants whose roots have been severed by said cutting edges to cause the removal of said plants from the soil with the lifting of the tool.

2. A weed-cutting and extracting tool comprising an elongated handle, a soil-penetrating and weed-severing blade carried by the lower end of said handle, said blade including a handle-secured shank, the latter terminating at the lower end thereof in a flattened blade section, said blade section being notched at its lower end to provide a pair of beveled cutting edges which are arranged in substantially V-shaped order and forming an apex at their meeting ends, said edges sloping downwardly and inwardly from an upper surface of said blade section toward an opposite or lower surface thereof, and a pair of relatively equidistantly spaced prong elements stationarily mounted on the upper surface of said blade section contiguous to the apex of the notch formed by said cutting edges, said prong elements being arranged on opposite sides of the longitudinal center of the blade section occupied by the notched apex, each of said prongs extending angularly and upwardly in acute angular relationship with respect to the plane of the upper surface of said blade section, said prongs being disposed in relatively parallel order throughout their lengths, said prong element serving to engage and receive plants severed by said cutting edges to remove the severed plants from the soil with the tool.

GEORGE S. BUTLER.

References Cited in the file of this patent

UNITED STATES PATENTS

| Number | Name | Date |
|---|---|---|
| 237,867 | Hood | Feb. 15, 1881 |
| 311,428 | Hill | Jan. 27, 1885 |
| 1,037,590 | Bush | Sept. 3, 1912 |
| 1,043,758 | Ferwerda | Nov. 5, 1912 |
| 1,079,619 | Walton | Nov. 25, 1913 |
| 1,131,714 | Kress | Mar. 16, 1915 |
| 2,006,672 | Combs | July 2, 1935 |
| 2,066,803 | Sawyer | Jan. 5, 1937 |